Feb. 7, 1961 M. MIKLOSEK 2,970,413
APPARATUS FOR SURFACING GLASS SHEETS
Filed Aug. 28, 1959 10 Sheets-Sheet 3

INVENTOR.
Martin Miklosek
BY
Nobbe & Swope
ATTORNEYS

Fig. 11

INVENTOR.
Martin Miklosek
BY
Nobbe & Swope
ATTORNEYS

Feb. 7, 1961  M. MIKLOSEK  2,970,413
APPARATUS FOR SURFACING GLASS SHEETS
Filed Aug. 28, 1959  10 Sheets-Sheet 8

Fig. 12

INVENTOR.
Martin Miklosek
BY
Nobbe & Swope
ATTORNEYS

United States Patent Office 2,970,413
Patented Feb. 7, 1961

2,970,413

APPARATUS FOR SURFACING GLASS SHEETS

Martin Miklosek, Toledo, Ohio, assignor to Libbey-Owens-Ford Glass Company, Toledo, Ohio, a corporation of Ohio Filed Aug. 28, 1959, Ser. No. 836,691

9 Claims. (Cl. 51—240)

This invention broadly relates to surfacing of glass sheets and is more particularly directed to an improved apparatus for controlling the movement of glass supporting tables.

In the manufacture of plate glass, the glass in blank form is placed upon moving tables. These tables are moved along a path defined by a plurality of interconnected conveyors so that the glass may be surfaced by suitable tools. This path is normally arranged to include two parallel surfacing lines, the direction of travel on one line being opposite to the direction of travel on the other line, and two interconnecting transfer lines, one at each end of the surfacing lines. Therefore, the path defined by the conveyors is in the form of an endless square, commonly referred to as continuous system and the transfer devices have been provided to move the tables when a change in the direction of travel is to be made.

As the tables move along a surfacing line, and before they actually pass under the surfacing tools, they are in abutting relationship to receive the glass sheets for bedding and to form a firm base for surfacing. Therefore, it is possible to bed glass onto the tables without regard to th size of the glass blank. If the tables did not abut then the size of the blanks would necessarily have to be restricted to the same or a smaller size than that of the tables.

When it is necessary to change the direction of travel of a table, for example from a surfacing line to a transfer line and after the surfaced blank has been removed from the tables, the lead table in the surfacing line of tables is separated from the remainder of the tables so that it may be engaged by the transfer device. This device carries the separated table away rapidly so as to clear the following tables and places the table in motion along a path 90° removed from the path of the surfacing line.

Now, as will be pointed out in greater detail as the specification proceeds, when this table is passed from the transfer line onto the second surfacing line, which is parallel to the first mentioned line but operable in the opposite direction, it must be passed thereover in a manner insuring that it will not bump into the tables already positioned on and moving along the second line.

This bumping transfer is not desirable for a number of reasons. For example, if uncontrolled such bumping would be likely to damage the tables and also to the track or line. This latter problem was recognized in the recently issued patent to Bonner, No. 2,874,644, issued February 24, 1959. In this patent a system was proposed that would maintain a separation between the tables at all times even when moving under the surfacing tools. This solution however, for the reasons hereinbefore mentioned has not been found to be particularly desirable. More particularly, when a transfer is made from a transfer line to a surfacing line, any jarring of the glass sheets on the tables already carried along this surfacing line would cause them to be loosened and thereby impair the surfacing finish imparted by the surfacing tools. Thus, the movement of a table from a transfer line to a surfacing line must be made with a minimum of force being exerted upon the tables already moving along the surfacing line.

It is therefore a primary object of the present invention to provide an improved apparatus for transferring the movable tables employed in a continuous surfacing system from a transfer line to a surfacing line in a smooth, uninterrupted manner without undesirable bumping.

It is another object of the present invention to provide an improved apparatus for delivering a glass supporting table into abutting relationship with the end table of a plurality of abutting tables being carried along a continuous conveyor with a minimum of force transfer to the already abutting tables.

Other objects and advantages of the invention will become more apparent during the course of the following description when taken in connection with the accompanying drawings.

In the drawings wherein like numerals are employed to designate like parts throughout the same.

Figures 1, 2:
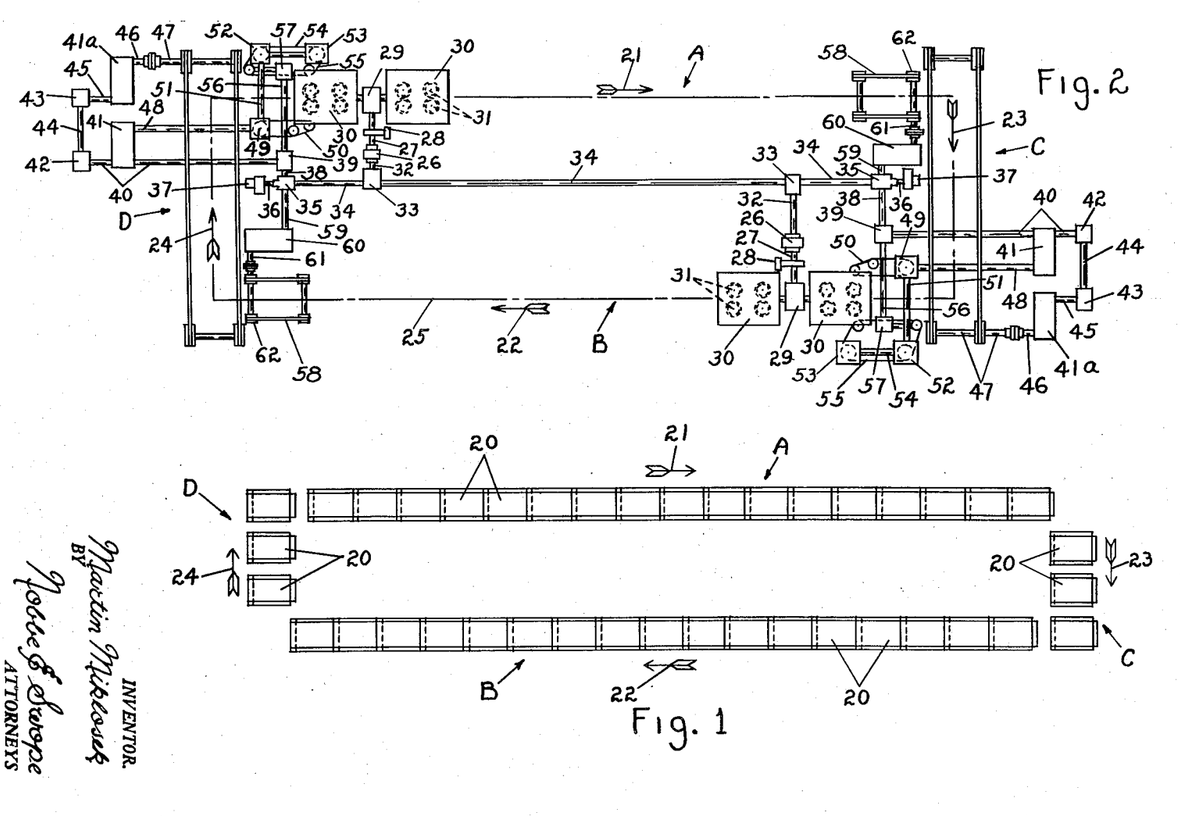
Fig. 1 is a schematic plan view showing the position of the tables at the end of a transfer movement.
Fig. 2 is a schematic plan view of the drive mechanism for synchronizing the transfer movement of the tables with the line travel of the tables.

Fig. 1 diagrammatically illustrates a plurality of tables 20 aligned in end to end abutting relation to form a pair of lines A and B for surfacing glass sheets. The lines are in parallel, spaced relation and advance at a synchronized rate in opposed directions, as indicated by the arrows 21 and 22. As shown in Fig. 1, the relative positions of the lead, intermediate and trailing tables of both lines are identical.

A transfer mechanism C moves the lead table of line A in a transverse direction, as indicated by the arrow 23, into alignment with the trailing table of line B. A similar transfer mechanism D moves the lead table of line B transversely in the direction of the arrow 24, into alignment with the trailing table of line A. However, the transfer of tables from one line to the other is done in steps, with the transfer mechanisms moving intermittently with a dwell therebetween for loading and unloading the tables, and as shown in Fig. 1, three tables 20 are supported by each transfer mechanism at all times. The tables 20, in the position shown in Fig. 1, are at the end of a transfer and the lead tables of each line are now moved onto the transfer mechanisms at virtually the same time the tables in alignment with the trailing end of each line move up to join the line.

Fig. 2 is a schematic plan view of the table and transfer drive mechanisms which move the tables along the dashed line 25 conforming to the direction of movement of the surfacing lines A and B and the table transfers C and D.

An electric motor 26 is provided at the starting point of each surfacing line A and B and each is connected by a shaft 27 extending through a braking mechanism 28 and a gear box 29 to a pair of gear boxes 30. Four pinions 31 extend above the surface of each of the gear boxes 30 to straddle the dashed line 25 at the starting point of each surfacing line A and B. The pinions 31 engage the tables 20 and push the tables comprising each line in the direction of the arrows 21 and 22 in a manner to be hereinafter disclosed.

A shaft 32 extends from the end of each motor 26 opposite the shaft 27 into a reduction gear box 33. Another shaft 34 joins the gear boxes 33 and serves to synchronize the movement of the tables 20 comprising the surfacing lines A and B. The synchronizing shaft 34 extends through each reduction gear box 33 terminating at each end in a combination worm gear reducer and clutch 35 each of which are connected by a shaft 36 to an auxiliary drive motor 37.

Another shaft 38 extends from each gear box 35 to another gear box 39 to rotate the input shaft 40 of an intermittent motion transmitting apparatus 41 of the Geneva type at a constant rate. The shaft 40 extends through the intermittent motion transmitting apparatus 41 and bevel gear box 42, which is in turn connected to another bevel gear box 43 by a shaft 44. The bevel gear box 43 is connected to the input shaft 45 of a second intermittent motion transmitting device which is identical with the device 41 and it therefore indicated by the numeral 41a to retain both the identical construction and the separate functions of each. The output shaft 46 of each intermittent motion transmitting device 41a is connected by a shaft 47 to respectively advance the transfer mechanisms C and D in an intermittent motion in the direction of the arrows 23 and 24. The transfer mechanisms are each a chain and sprocket type and will be described in detail hereinafter.

The output shaft 48 of each intermittent motion transmitting device 41 is connected to a gear box 49 which drives a pusher chain 50 on the inside of each surfacing line and a shaft 51 extends transversely under each surfacing line to a pair of gear boxes 52 and 53 interconnected by a shaft 54 to drive a second pusher chain 55 in synchronized relation to the first pusher chain 50 to move the table 20 which is aligned with each surfacing line at an accelerated rate to respectively join a surfacing line A or B. The pusher chains 50 and 55 of each surfacing line are accurately positioned for receiving a table 20 upon movement of the transfer mechanisms C and D through an interconnecting shaft 56 and gear box 57 for controlling a locating mechanism which will be disclosed hereinafter.

The lead tables 20 of each surfacing line are advanced rapidly by a pin chain device 58 driven from the worm gear reducer 35 through the input shaft 59 of a third intermittent motion transmitting device 60, which differs slightly from the identical first and second intermittent motion transmitting devices 41 and 41a in a manner to be hereinafter disclosed. The output shaft 61 of the intermittent motion device 60 is joined to a pair of sprockets 62 engaging the pin chains 58.

Briefly stated, the advance of each of the surfacing lines A and B at a constant rate and the intermittent motion of the transfer mechanisms C and D, the pusher chains 50 and 55 and the pin chains 58 are synchronized.

Figure 3:
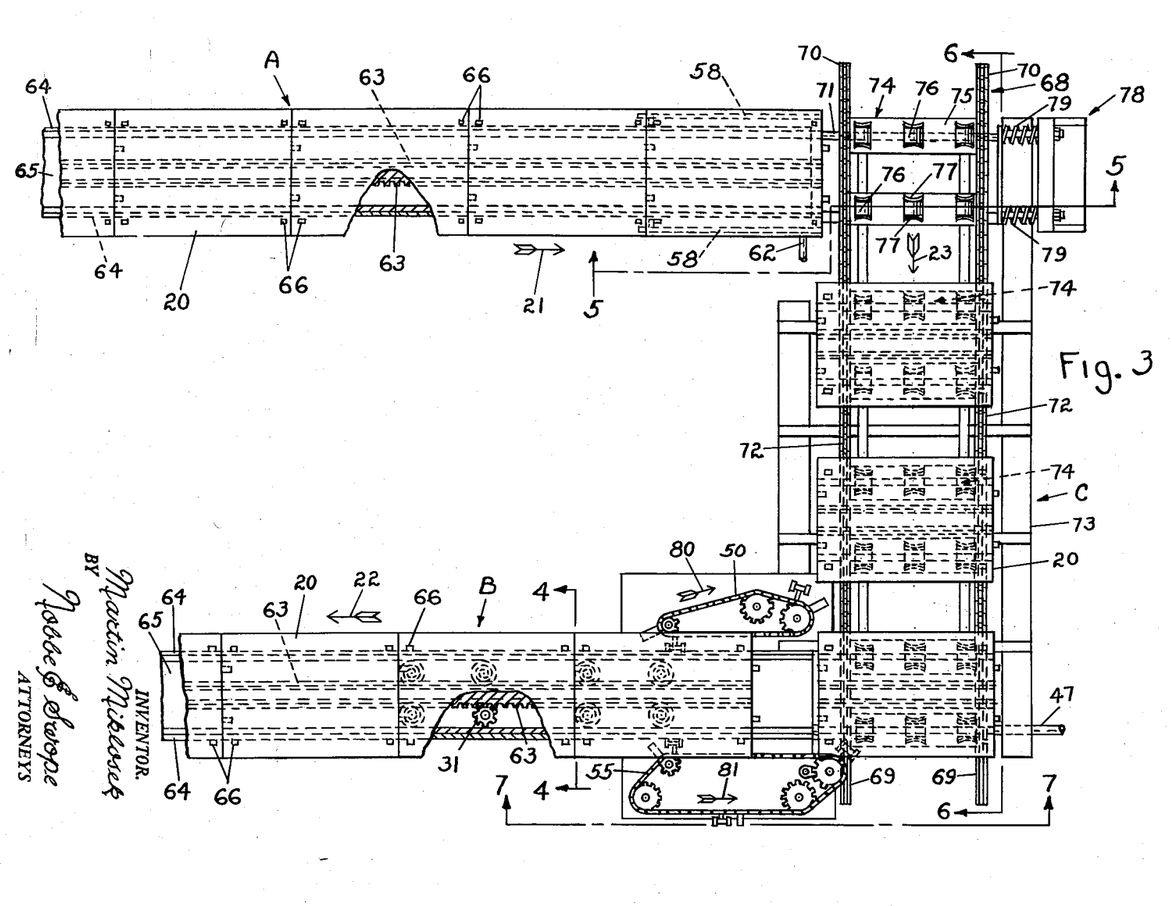
Fig. 3 is a plan view showing the lead end of one surfacing line and the mechanism for successively transferring the tables from the lead end of that line to the trailing end of a second line.
Figure 4:
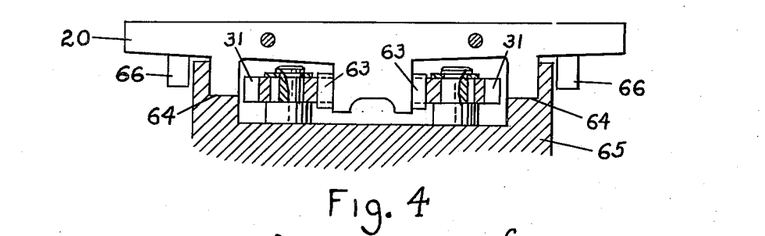
Fig. 4 is a section taken on the line 4—4 of Fig. 3 showing the pinion and rack pusher arrangement for each line of tables.

Fig. 3 is an enlarged plan view of one end of the apparatus illustrating the pinions 31 engaging a pair of racks 63 attached to the underside of each table and extending the full length thereof to push the tables comprising each line A and B at a constant rate along ways 64 of a base 65. This structure is best shown in Fig. 4. Also as shown in Figs. 3 and 4, four lugs 66 are welded to the lower surface of each table 20 adjacent the four corners thereof and outside the ways 64.

As the lead table 20 of each surfacing line advances and the trailing set of lugs 66 move over the chains 58, a pin 67 (Fig. 5) on each chain engages one of the trailing lugs to accelerate the movement of the lead table, thereby separating it from the line and depositing it upon one of the transfer mechanisms C or D.

Figure 5:
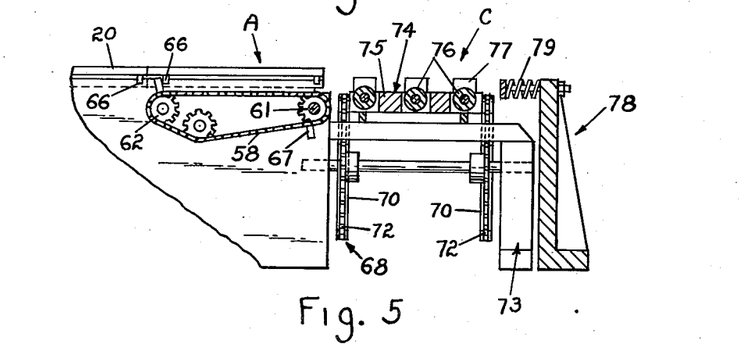
Fig. 5 is a section taken on the line 5—5 of Fig. 3 showing the apparatus for removing the lead table from a line and the transfer mechanism for receiving the table.
Figure 6:
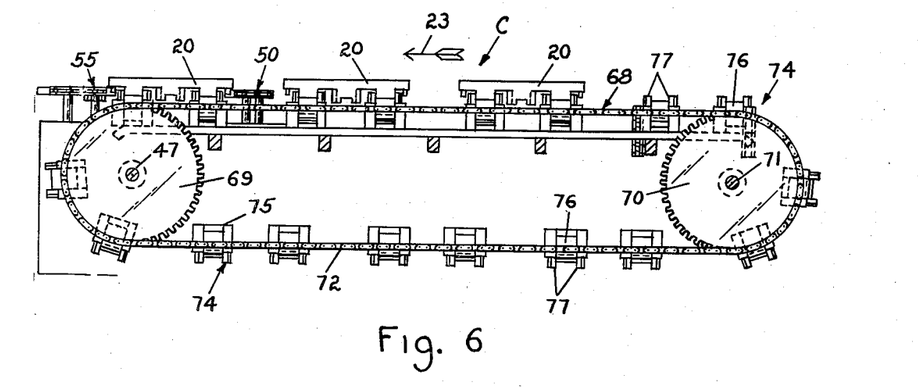
Fig. 6 is an elevation of the table transfer mechanism taken on the line 6—6 of Fig. 3.
Figure 7:
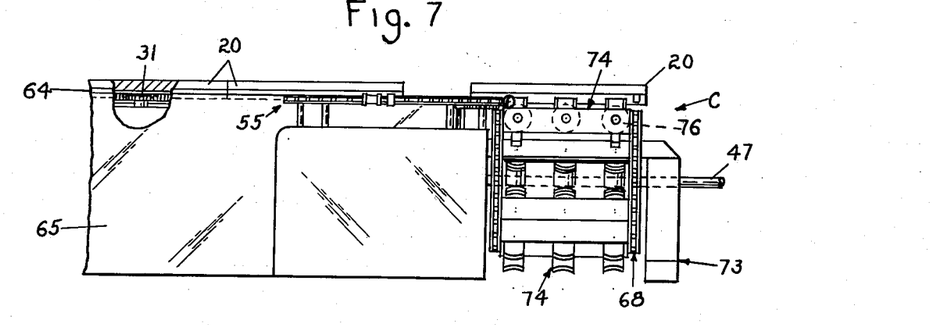
Fig. 7 is an end elevation of the table transfer apparatus and a side elevation of the apparatus for joining a table to the line and is taken on the line 7—7 of Fig. 3.

The identical transfer mechanisms C and D are best shown in Figs. 3, 5 and 6 and each is a chain and sprocket type conveyor 68 with one pair of sprockets 69 mounted in spaced relation on the shaft 47 which is connected to the output shaft 46 of the intermittent motion transmitting device 41a and a second pair of sprockets 70 mounted on an idler shaft 71 with a chain 72 engaging aligned sprockets of each pair. The shafts 47 and 71 are supported in suitable bearings on a base 73. The chains 70 carry a plurality of table supports 74, spaced at equal intervals, each comprised of a bar 75 extending transversely to the flight of the conveyor 68 to join the chains. Each of the bars 75 carries a plurality of rollers 76 arranged in paired rows which are in alignment with the ways 64 when the transfer mechanisms are at rest. A pair of guides 77 flank each roller 76 and keep the tables 20 in parallel alignment with the ways 64 when the transfer mechanism is both at rest and in motion. A bumper 78, loaded by springs 79, is provided to yieldably arrest the movement of each table 20 as it moves onto the transfer mechanism. Thereafter, each table 20 is transferred by intermittent motion into alignment with the start of the opposed surfacing line.

As the transfer mechanisms C and D come to a halt, after a short dwell, the pusher chains 50 and 55 are respectively moved at a synchronized rate in the directions of the arrows 80 and 81 (Fig. 3) and though they engage the front or lead pair of lugs or pusher block 66 on opposed sides of the table at slightly different intervals, the motion is substantially the same for both.

Figure 8:
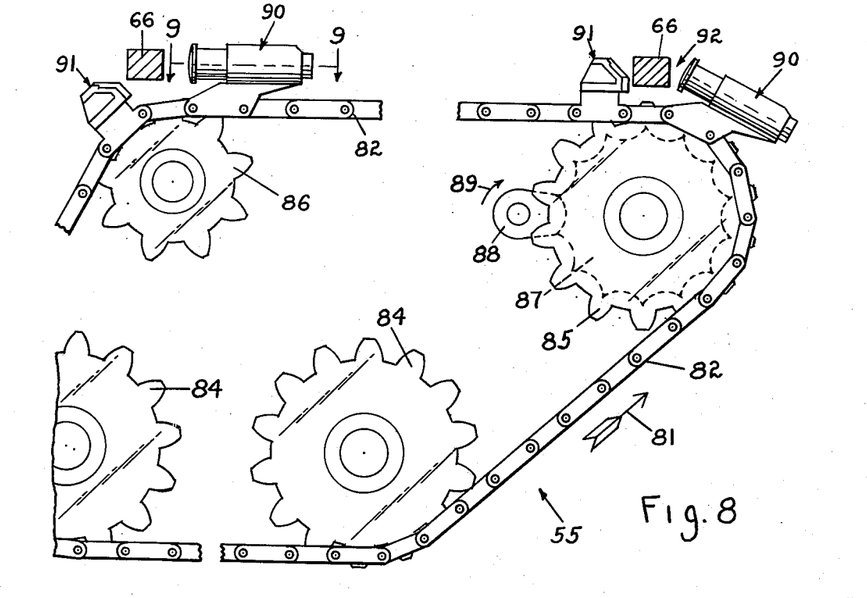
Fig. 8 is a detail of a pusher chain for moving a table from a transfer mechanism to join a surfacing line.
Figure 9:
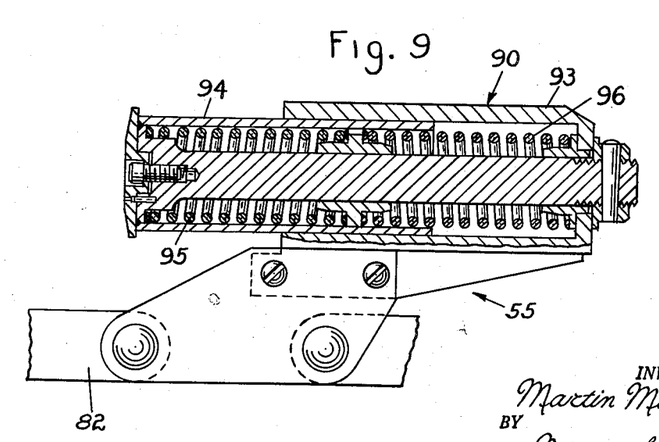
Fig. 9 is a cross-section of a spring loaded table pusher taken on the line 9—9 of Fig. 8.

An enlarged plan view of the outer pusher chain 55 is shown in Fig. 8 and the pusher block assembly is shown in detail in Fig. 9. The chain proper is designated by the numeral 82 and is moved in a path in the direction of the arrow 81 over a pair of drive sprockets 84 and a pair of idler sprockets 85 and 86. A cam wheel 87 is fastened to the underside of the idler sprocket 85 and is periodically engaged by a cam 88 rotating constantly in the direction of the arrow 89 and serves to position the chain 82 for reception of a lug 66 on the lead edge of a table 20 at the end of a transfer motion.

The table propelling apparatus 50 is comprised of two elements, namely a pusher 90 and a restraining block 91 secured to the chain 82 as shown in Fig. 8. The right hand portion of Fig. 8 shows the relative position of the pusher 90 and the restraining block 91 with the chain at rest and the pusher block 66 occupying the gap 92 between the two elements at the end of a transfer movement. The chain 82 then advances in the direction of the arrow 81 coming to rest in the position shown at the left of Fig. 8 with a second pusher 90 occupying the right hand position. At this time, the pinions 31 have engaged the racks 63 to advance the table 20 with the surfacing line to which it has been joined and the lug 66 will clear the restraining block 91. The restraining block 91 confines the lug 66 within the gap 92 in the interim time between starting and stopping of the pusher chain 82.

Referring to Fig. 9, the pusher 90 is composed of a hollow cylindrical case 93 for telescopically receiving a plunger 94 and a pair of springs 95 and 96 normally urging the plunger into the extended positon shown. The springs yield slightly upon contact with a lug 66 and yield still more upon contact of a table 20 with one of the lines to assure a firm but gentle contact. The significance of this yieldable engagement will become apparent as the specification proceeds.

As previously disclosed, the intermittent motion mechanisms 41, 41a and 60 all use the Geneva motion. However the mechanisms 41 and 41a are identical in construction and particularly novel in that they cause the tables to follow a uniquely controlled deceleration phase. The mechanism 60 differs therefrom and is adapted to remove the lead table from the line and deposit it onto a transfer mechanism by conventional Geneva motion.

Figure 10:
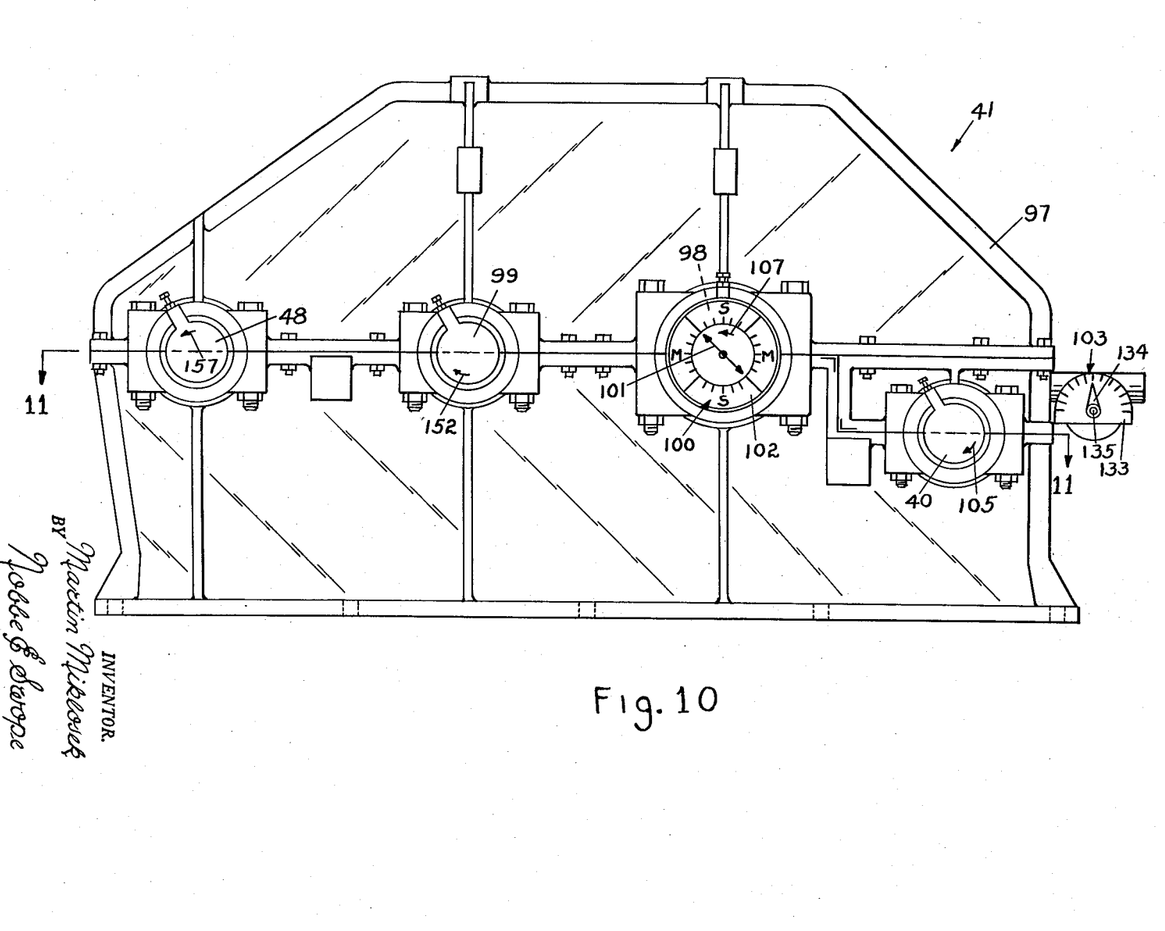
Fig. 10 is a side elevation of a Geneva type gear box.

Fig. 10 is a side elevation of the improved mechanism 41 for producing the desired intermittent motion and, as shown, includes a split housing 97 for supporting four transversely extending shafts, namely; the input shaft 40, two intermediate shafts 98 and 99 and the outshaft 48. The shaft 98 carries an indicator 100 comprised of a pointer 101 rotatable with the shaft 98 and a stationary dial 102 divided into two pairs of diametrically opposed quadrants. The horizontally opposed quadrants are inscribed with the letter M and the vertically opposed quadrants are inscribed with the letter S, respectively representing abbreviations for "movement" and "stopped." The indicator 103 at the right of Fig. 10 is part of a cam operated device for adjusting the span of a deceleration near the end of each intermittent movement of the output shaft 48 of the mechanisms 41 and 41a, in a manner to be described hereinafter.

Figure 11:
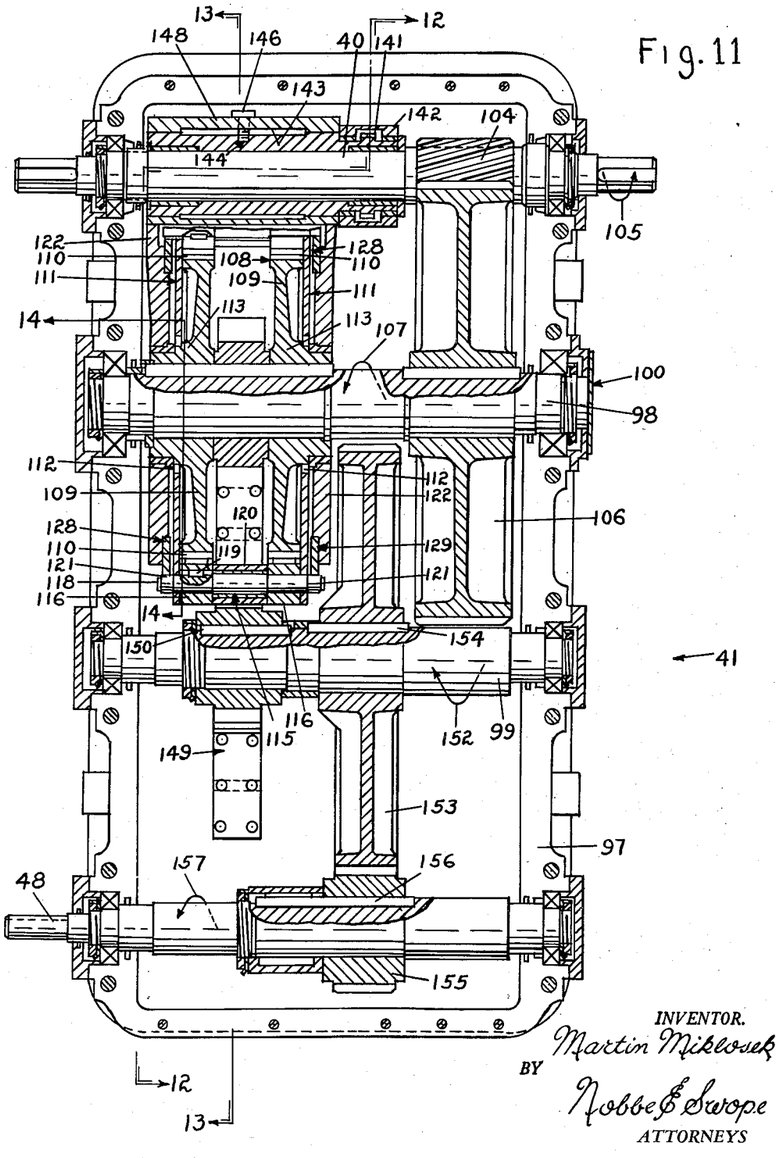
Fig. 11 is a horizontal section through the Geneva gear box taken on the line 11—11 of Fig. 10.
Figure 12:
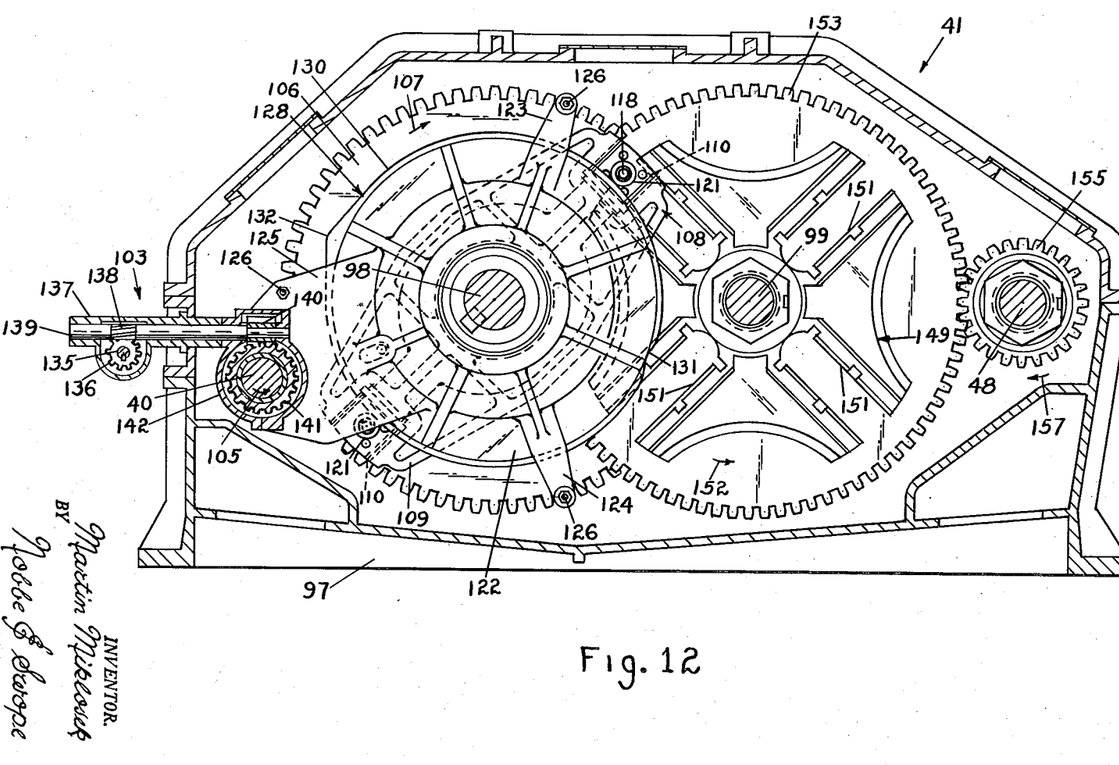
Fig. 12 is a vertical section through the Geneva gear box taken on the line 12—12 of Fig. 11.
Figures 13, 14:
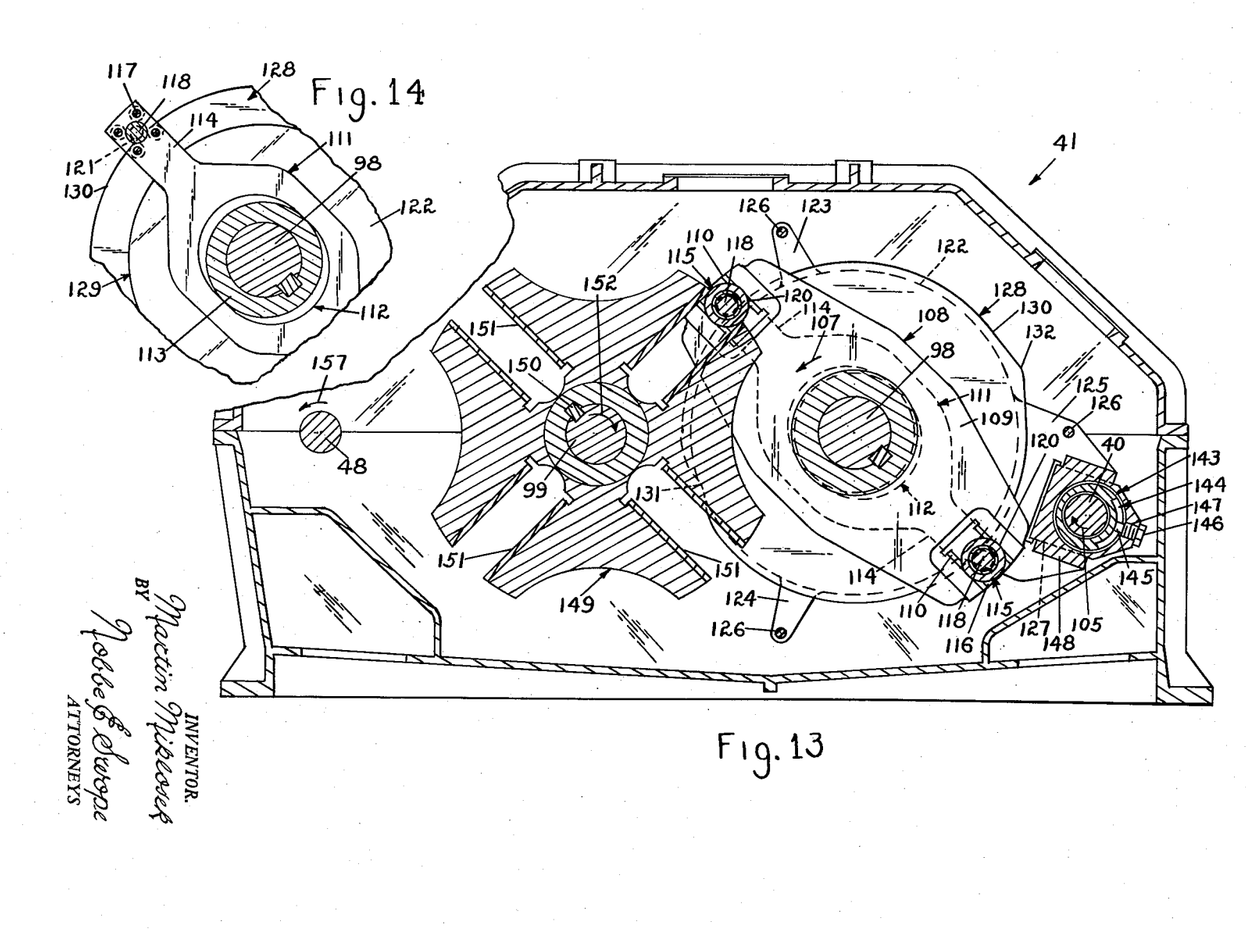
Fig. 13 is another vertical section through the Geneva gear box taken on the line 13—13 of Fig. 11.
Fig. 14 is a fragmentary vertical section taken on the line 14—14 of Fig. 11.

Referring to Figs. 11 through 14, a helical pinion 104 is mounted for rotation with the input shaft 40 in the direction of the arrow 105 and the pinion is in mesh with a mating helical gear 106 keyed to the intermediate shaft 98. The gear 106, the shaft 98 and the pointer 101 are driven in the direction of the arrow 107. A drive member 108 is also keyed to the intermediate shaft 98 in spaced relationship to the helical gear 106. The drive member is comprised of a pair of flanges 109 each provided with a pair of diametrically opposed ways 110 which when the member is keyed to the shaft 98 are aligned in pairs equidistant from the axis of rotation of the shaft 98. A pair of identical yokes 111 lie in face to face relation with the outer surfaces of the flanges 109 and each yoke has an opening 112 engaging two sides of the hub 113 of the flange 109 and the opening 112 is elongated in the direction of the ways 110. A pair of legs 114 extend outwardly in diametrically opposed directions in alignment with the ways 110 and carry a drive roller assembly 115 mounted at the extremity of each leg for movement within the ways 110. In other words the drive roller assemblies 115 are spaced a fixed distance apart by the yokes 111 and are free to move within the ways 110 up to the limit of the ways and the amount of elongation of the opening 112. This construction is best shown in Figs. 13 and 14.

Each drive roller assembly 115 is comprised of two bearing blocks 116 attached to the outermost extremity of each leg 114 of the yoke 111 by four screws 117 (Fig. 14) and each bearing block is guided for movement by one of the ways 110. A shaft 118 extends through circular openings in the bearing blocks 116 and the yokes 111 and is held stationary therein by keys 119. A drive roller 120 is journaled on the shaft 118 and occupies all of the space between the flanges 109. A pair of cam followers 121 are mounted, one each at opposite extremities of the shaft 118 outside the yokes 111, for free rotation on the shaft.

One of a pair of right and left hand mounting plates 122 are mounted for a limited rotary movement on a reduced diameter of the hub 113 of each flange 109 outside the drive member 108 with the major portion of the periphery of each plate 122 concentric with the axis of the shaft 98. As best shown in Figs. 12 and 13, three ears 123, 124 and 125 project from the outer surface of each plate 122 at spaced intervals beyond the circular periphery of each plate 122. The ears of opposed plates 122 are paired in angular alignment and tie rods 126 maintain the proper spacing between the inner faces of the plates 122 and hold the assembly of the two plates 122 rigid. The ear 125 is larger than the other two ears 123 and 124 and is provided with a way 127.

A plate cam 128 is mounted in a circular undercut 129 adjacent the periphery of each plate 122 so that the inner face of the cam is in bearing contact flush with the inner face of the plate 122. The plate cams 128 are identical and each is provided with a peripheral surface 130 for guiding the cam followers 121. The peripheral surface 130 is concentric with the axis of the shaft 98 over the major portion of its periphery, the only deviation from the circular configuration being a radially formed indentation 131 and a diametrically opposed rise 132 of equal magnitude with the indentation.

The indicator 103, Figs. 10 and 12, is provided with a dial 133 and a movable pointer 134 mounted on a shaft 135. By moving the pointer to the right or left of the position shown the plate cams 128 are rotated in unison to respectively retard and advance the relative angular position of the diametrically opposed indentation 131 and rise 132 through the following components. A gear 136 is fastened to the shaft 135 inside a housing 137 and is in mesh with a gear 138 machined around the periphery of a shaft 139. The shaft 139 projects into the housing 97 and has secured to the end within the housing 97 a worm gear 140 which is in mesh with a worm wheel 141. A housing 142 encloses the worm gear and the worm wheel. The worm wheel 141 is part of a cylindrical cam 143 which is journaled on the shaft 40. The cam 143 is provided with a groove 144 which receives the dog point 145 of a screw 146. The screw 146 engages threads 147 formed in an elongated guide member 148 which rides in the aligned ways 127 of the plates 122.

Therefore rotation of the shaft 135 and the pointer 134 attached thereto imparts to the cylindrical cam 143 a rotary motion which is transmitted through the guide member 148 to rotate the mounting plates 122 and the plate cams 128 for timing purposes.

This fine adjustment causes a rotation of mounting plate 122 and the affixed cam 128 about shaft 98 to a limit of plus or minus 1° from its prelocated fixed position. The timing mechanism therefore allows for close control of the precise moment in which the roller drive assembly 115 will enter into the radially extending actuating slots to be later described in the driven member of the Geneva gearing.

By providing the indentations 131 in cam 128 and since the driven member 108 has an elongated opening 112, when the driving roller assembly enters into the indentations, the radius of the driving member 108 is shortened and the radius of the driven member, i.e. the Maltese cross member is increased. Now as the driving member 108 continues to rotate and the roller assembly 115 rises out of indentations 131 to ride again on the portion of the periphery 130 of plate 128 of constant dimension, a reverse action takes place. At this time the radius of the driving member 108 is increased and the radius of the driven member, i.e. the Maltese cross is decreased. Therefore, during the deceleration phase of the Geneva movement initially, by shortening the radius of the driving member, the deceleration phase occurs at a greater rate than would be true if there were no indentations 131. Having thus caused the deceleration to proceed at a greater rate, a table moving from a transfer line onto a surfacing line is slowed down in a greatly reduced lineal path of travel and brought quickly to the speed of the tables already in the line to which it is being transferred. During the brief period of time in which this action is reversed, i.e. when the roller drive assembly 115 is raising out of indentations 131, the table is caused to accelerate slightly above the speed of the tables already on the surfacing line and is impressed against the preceding table. This acceleration is absorbed through the use of the pushers 90 equipped with springs 95 and 96 and insures a firm but gentle contact.

There has been thus provided within the deceleration phase a period in which deceleration is more rapid and proceeds at a greater rate during a limited length of travel of a surfacing table, this phase being followed by an even shorter period of actual acceleration. By thus modifying the Geneva motion, it has been found possible to bring one of the surfacing tables from the transfer line into firm but gentle contact with the tables already on a surfacing line. This modification of the motion is extremely important since with the conventional Geneva gearing heretofore described in the prior art, it was possible only to run the surfacing lines at a speed at least no greater than 385" per minute while with the improved motion embodying the aforediscussed action it has been possible to increase the line speed to an excess of 485" per minute. This is a significant advance and has been found to be possible only when using the improved techniques above discussed. While this modification of the motion has been made to the deceleration phase of the Geneva motion it could also be applied if desired in a manner to modify the acceleration phase.

A Geneva wheel 149 is fastened to the intermediate shaft 99 for rotation therewith by a key and slot combination 150 and is positioned along the shaft so that four equally spaced, radially extending slots 151 in turn receive one of the drive rollers 120 for intermittently moving the Geneva wheel 90 degrees in the direction of the arrow 152. Since there are two diametrically opposed drive rollers 120 and four slots 151 the Geneva wheel will be advanced 180 degrees in two 90 degree intermittent motions for each revolution of the drive member 108.

As shown in Figs. 11 and 12, a helical gear 153 is also fastened to the intermediate shaft 99 for rotation therewith by a key and slot combination 154 and is in mesh with a helical pinion 155 which is in turn fastened to the output shaft 48 by a key and slot combination 156 for rotating the output shaft 48 intermittently in the direction of the arrow 157.

Referring to Figs. 2, 11, 12 and 13 the intermittent motion devices 41 and 41a, respectively driving the pusher chains 50 and 55 and the transfer mechanisms C and D in a series of intermittent motions in timed relation. The input shaft 40 is rotated at a constant rate of speed and directly connected by gears 104 and 106 to rotate the intermediate shaft 98 and the drive member 108 at a reduced constant rate. The drive member 108 is guided by a pair of followers 121 riding on a pair of plate cams 128 to rotate the Geneva wheel 149 and the gear 153 about the shaft 99. As previously disclosed, the Geneva wheel is advanced 180 degrees in two intermittent 90 degree steps for each revolution of the drive member 108. Near the end of the engagement of the drive member 108 with any slot 151 in the Geneva wheel 149, the yokes 111 carrying the drive roller assemblies 115 are shifted by the indentation 131 and the diametrically opposed rise 132 to decelerate the motion of the Geneva wheel 149. The period of deceleration is near the end of the movement of the table pusher chains 50 and 55 and the table transfer mechanisms C and D. The gear 153 is in mesh with the pinion 155 attached to the output shaft 48 to increase the rate at which the output shaft 48 rotates intermittently over the rate of rotation of the intermediate shafts 98 and 99.

The intermittent motion mechanism 60, Fig. 2, for moving the lead table 20 of each surfacing line A and B onto the respective transfer mechanism C or D is a straight Geneva type motion within the unique deceleration and consequently control offered by indentations 131 and rise 132, the drive roller assemblies 115 are mounted at a fixed radius on the drive member 108. The yokes 111, the mounting plates 122 and the plate cams 128 are omitted from the mechanism 60.

Figure 15:
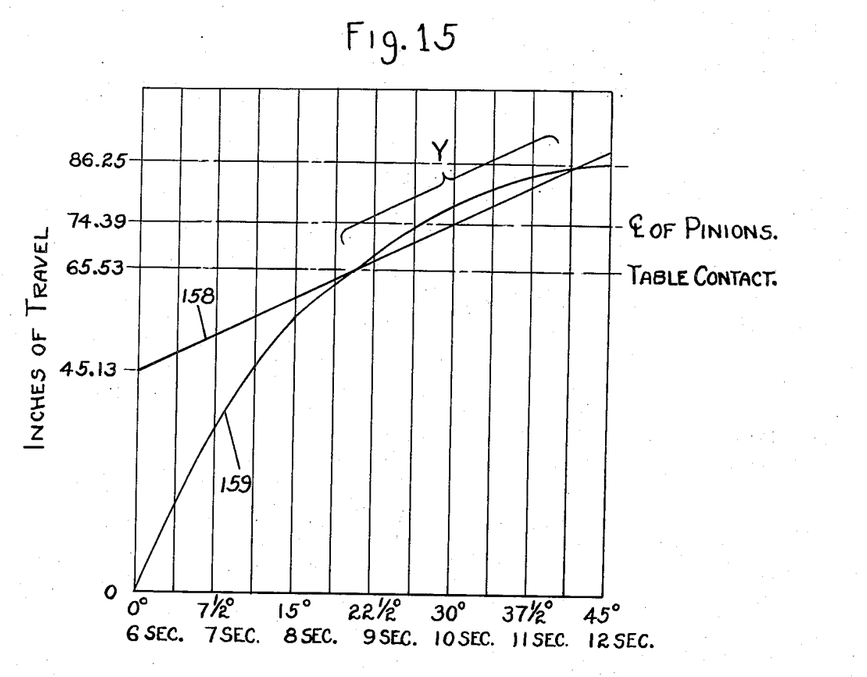
Fig. 15 is a graphic illustration of the relative movement of the tables comprising a surfacing line and the controlled, accelerated movement of a table joining the line.

The relative rate of motion of the tables 20 comprising a surfacing line, either A or B, and the accelerated movement of a table 20 moving from one of the transfer mechanisms C or D is graphically illustrated in Fig. 15. The straight line 158 indicates the constant rate of advance of a surfacing line and the curved line 159 represents the rate of advance of a table 20 moving from a transfer mechanism to join a surfacing line, wherein the rate of advance of the table 20 joining the line is greater than the line speed, but decelerates to substantially the line speed prior to contact with the line to avoid jarring of the line. The curve 159 is further characterized by a section Y indicating an overtravel of the pusher chains 50 and 55. The overtravel Y is nullified by compression of the springs 95 and 96 of the table pusher 90 permitting the plunger 94 to telescope within the case 93, however the springs 95 and 96 still exert a pressure upon the table lugs 66 to join the table 20 to the line in a firm but yieldable manner.

Figure 16:
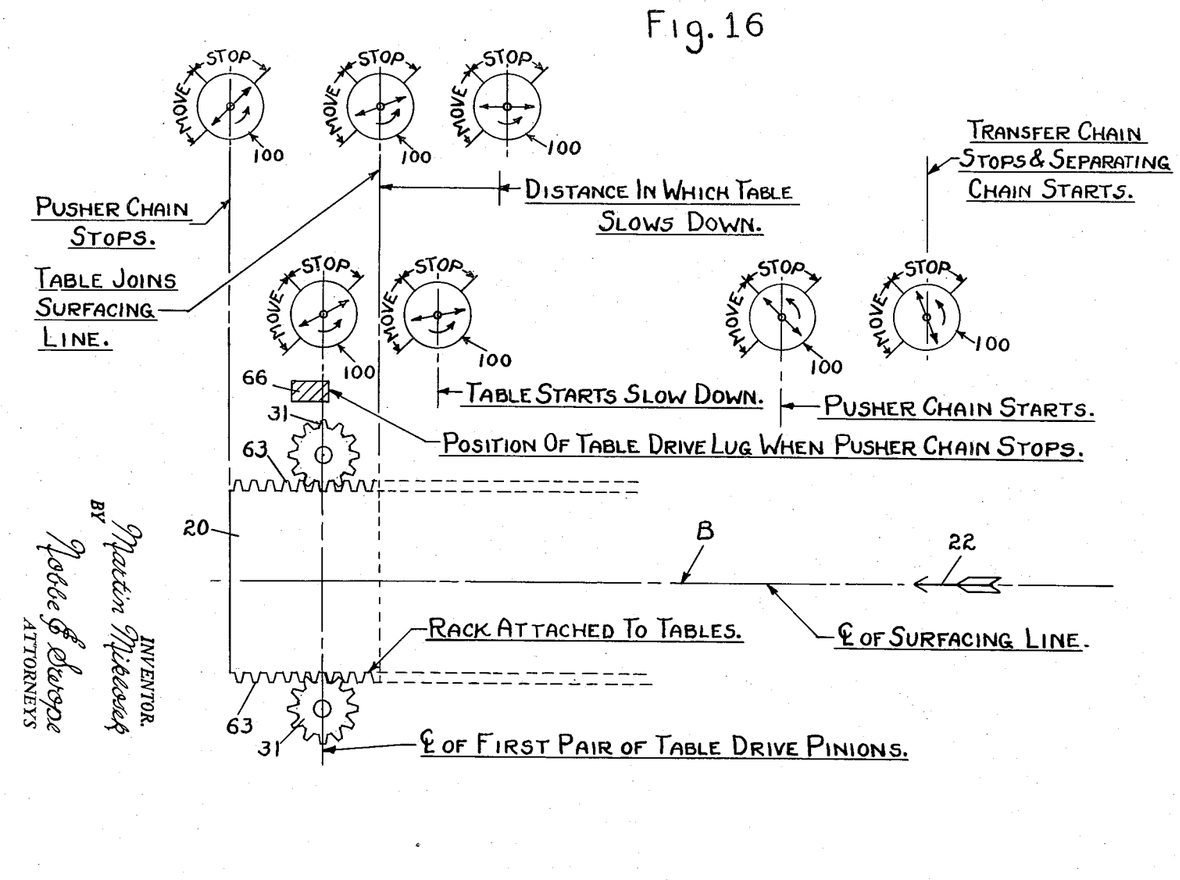
Fig. 16 is a graphic illustration of the timing of the intermittent motion of the transfer mechanisms with respect to the constant motion of the surfacing lines.

Fig. 16 graphically illustrates the timing of the pusher chains 50 and 55 with respect to the motion of the transfer mechanism chain C and the surfacing line B to which the table is being joined, therefore the motion of the line is from right to left in the direction of the arrow 22.

In operation on companion production lines for polishing first one side of a plate glass blank and then the other side thereof by transferring the blank from line A to line B, it has been found that the tables 20 move smoothly along the path indicated by the dashed line 25 of Fig. 2 in the relative positions indicated in Fig. 1 and the most important factor of all is that the tables 20 are successively moved from the transfer mechanisms C and D to respectively join the lines B and A with a minimum of shock. Since the tables 20 are of necessity large and heavy this feature becomes doubly important in that breakage of the plate glass blanks or marring of the surface because of the impact is eliminated.

It is to be understood that the forms of the invention disclosed herein are to be taken as the preferred embodiments thereof, and that various changes in the shape, size and arrangement of parts as well as various procedural changes may be resorted to without departing from the spirit of the invention or the scope of the following claims.

I claim:

1. In an apparatus for surfacing flat glass blanks resting on a plurality of individual tables and having two spaced parallel surfacing tracks for carrying the tables along under surfacing tools and two spaced transfer tracks, each of said transfer tracks connecting the adjacent ends of the surfacing tracks for moving the tables from one surfacing track to the other surfacing track and wherein the tables are controlled while moving from a surfacing track onto a connected transfer track by a first Geneva gearing and controlled while moving from the transfer track to the other connected surfacing track by a second Geneva gearing, said second Geneva gearing including an input shaft, and output shaft, a Maltese cross member having four equally spaced radial slots, said Maltese cross member mounted on a first shaft and geared to said output shaft of said second Geneva gearing and a driving member mounted onto a second shaft, said driving member being geared to said input shaft of said second Geneva gearing, said drive member including at least one flange member, said flange member having two diametrically opposite ways, roller drive assemblies mounted in said ways, said assemblies adapted to enter into the radial slots in said Maltese cross member wherein the constant input into said second Geneva gearing, through said input shaft, is transformed into intermittent motion of said output shaft which intermittent motion has an initial acceleration phase followed by a subsequent deceleration phase, the improvement comprising means for modifying at least one of the phases of each intermittent stage of the motion of said second Geneva gearing to cause said phase to proceed at a greater rate and means for controlling the moment at which said motion modifying means become operative.

2. The apparatus as defined in claim 1, wherein said motion modifying means are positioned to modify the deceleration phase of each stage of the intermittent motion of said second Geneva gearing.

3. The apparatus as defined in claim 1, wherein said flange member has a centrally disposed elongated opening through which said second shaft passes, said opening being elongated in the direction of the said ways, said motion modifying means including at least one cam plate, the peripheral surface of which engages said roller drive assemblies, said peripheral surface having a radially formed indentation from concentricity and a diametrically opposed rise of equal magnitude to alter the length of the stroke of said roller assemblies by causing a lateral shifting of said driving member, with respect to the shaft upon which it is mounted, in said elongated opening.

4. The apparatus as defined in claim 3, wherein said indentation is positioned on said cam plate so that it causes said flange, at the instant said roller assemblies enter into said indentation, to shift said driving member to shorten the stroke of said driving member and simultaneously to lengthen the stroke of said Maltese member whereby the deceleration phase of each stage of the intermittent motion proceeds at a greater rate.

5. The apparatus as defined in claim 3, wherein said means for controlling the operative movement of said motion modifying means includes a timing means to change the angular position of the indentation and the rise on said cam.

6. The apparatus as defined in claim 3, wherein said motion controlling means includes means for rotating said cam about its axis within the limits of plus or minus 1% from its predetermined position.

7. The apparatus as defined in claim 3, including a mounting plate mounted to said second shaft, said cam plate being positioned within a circular cutout adjacent the periphery of said mounting plate, the inner face of said cam being in bearing contact with the inner face of said mounting plate.

8. The apparatus as defined in claim 7, wherein said timing means includes an indicator having a movable pointer and means connecting said mavable pointer to said mounting plate whereby rotary motion imparted to said pointer is transmitted through said mounting plate to said cam plate to rotate said cam plate.

9. The apparatus as defined in claim 8, wherein said movable pointer is operative to alter the position of said indentaton and rise on said cam plate within the limits of plus or minus 1% from its predetermined position.

References Cited in the file of this patent

UNITED STATES PATENTS

| | | |
|---|---|---|
| 2,874,644 | Bonner | Feb. 24, 1959 |
| 2,883,801 | Dryon | Apr. 28, 1959 |